July 31, 1928.
H. HANEBERG
VALVE
Filed May 4, 1927
1,679,081
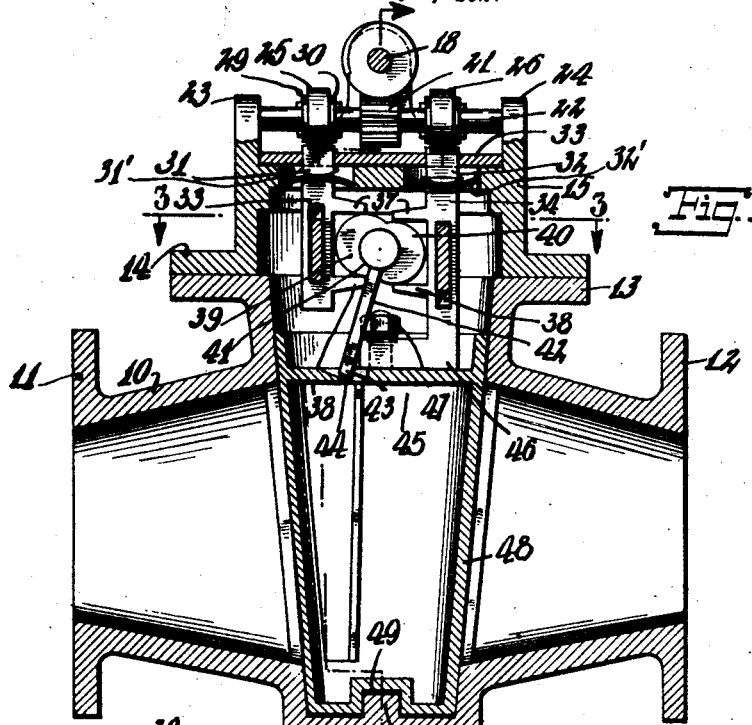
Fig. 1.
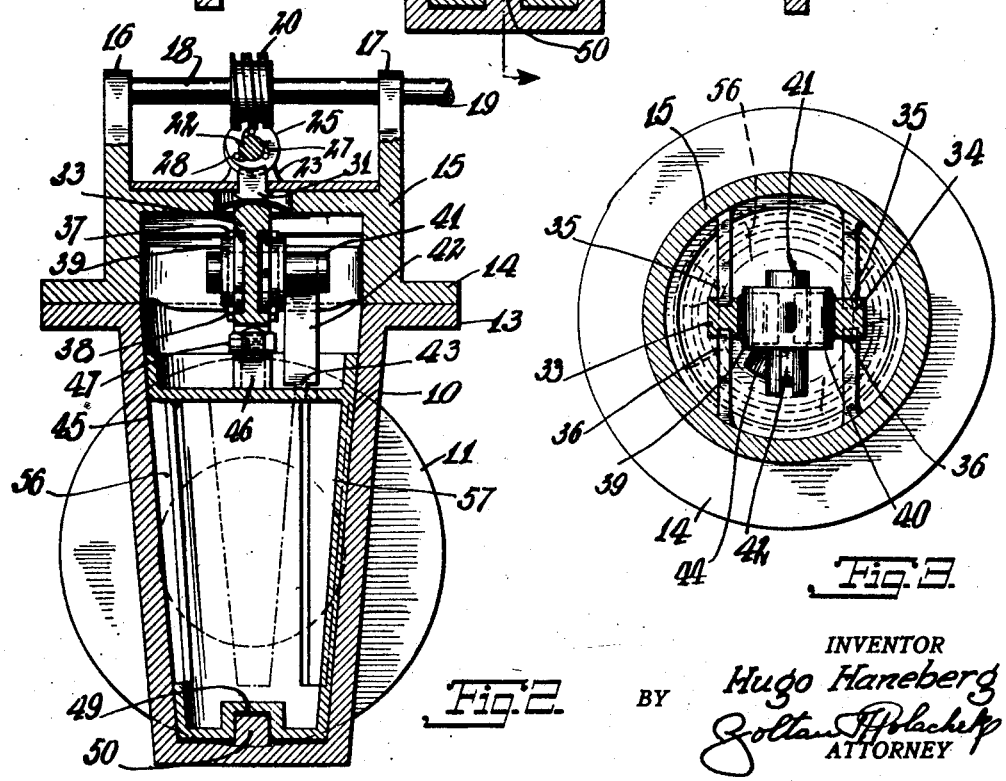
Fig. 2.
Fig. 3.
INVENTOR
Hugo Haneberg
BY
ATTORNEY Patented July 31, 1928.

1,679,081

UNITED STATES PATENT OFFICE.

HUGO HANEBERG, OF NEW YORK, N. Y.

VALVE.

Application filed May 4, 1927. Serial No. 188,637.

This invention relates to a new and useful device in the nature of a valve, particularly adapted for use in the handling or transmitting of liquids at relatively high pressures and at high temperatures.

The object of the invention is to provide a valve of novel construction and arrangement of parts, hereinafter more fully described, claimed and illustrated in the accompanying drawing.

Fig. 1 is a vertical central sectional view of my improved valve.

Fig. 2 is a similar sectional view taken on the line 2—2 of Fig. 1.

Fig. 3 is a transverse sectional view taken on the line 3—3 of Fig. 1.

As here embodied my improved valve comprises a valve body 10 or housing of hollow construction, provided with side flanged elements 11 and 12, as a means of securing the valve body 10 to similar flanged elements of pipe, not shown in the accompanying drawing, or the like, constituting the pipe line, to which my improved valve is attached. The valve body 10 is provided with a similar flanged element 13, positioned upwardly therefrom, to which the flanged element 14, of the valve cover 15, is attached.

The valve cover 15 is provided with upwardly extended lug elements 16 and 17, having apertures adapted to rotatively receive the shaft 18. The shaft 18 is provided with an extended portion 19, adapted to receive any desirable suitable means of rotating the shaft 18, such as commonly used for operating valves, depending upon the size of the said valve.

The worm 20 is secured to the shaft 18, and meshes with a worm 21. The worm 21 is secured to the shaft 22, rotatively mounted in the extended lug elements 23 and 24 of the valve cover 15. The cams 25 and 26 are provided with apertures adapted to receive the shaft 22. The said apertures are provided with recesses 27, adapted to receive the rollers 28, rods, or the like. The said cams 25 and 26 are held in the desired relative position on the shaft 22, by means of the collars 29 and 30, secured thereto. The latter described construction is such as will permit the cam 25, to be rotated in one direction, and the cam 26, to be rotated in the opposite direction, only. It is understood that the rollers 28 will frictionally engage the shaft 22 for the purpose of rotating the cams 25 and 26, as above set forth and described. The button members 31 and 32 are slidably mounted in the supplementary valve cover 33, adapted to enclose or cover the open end of the valve cover 15. The button members 31 and 32 are provided with recesses adapted to receive the cams 25 and 26, respectively. The button members 31 and 32 are held in contact with the members 31′ and 32′, respectively of disc shaped construction arranged in the openings formed in the upper portion of the valve cover 15, in contact with the key members 33 and 34, respectively slidably mounted intermediate the guide members 35 and 36. The key members 33 and 34 are provided with upper and lower extended elements 37 and 38, adapted to engage the cam elements 39 and 40 of the shaft 41. The shaft 41 is provided with an elongated axial opening adapted to receive the upper portion of the finger member 42, extended downwardly therefrom. The finger member 42, is provided with a free extremity 43, relatively smaller in width, adapted to engage the face cam 44 formed in the upper closed end 45 of the valve proper 48. The key member 34 is provided with an extended portion 46 pivotally secured as at 47 by a bolt, screw or the like to the closed end 45 of the valve proper 48. The valve proper 48, is of hollow frustum conical shape, adapted to engage in a similar shaped recess formed in the above mentioned valve body 10. The valve proper 48 is provided with an axial lower recess 49, adapted to receive the extended portion 50 of the valve body 10.

The above described construction is such as will permit the valve proper 48 to be held in engagement with the valve body 10, so as to prevent the flow of a liquid through my improved valve. The above described construction is such as will permit the valve proper to be somewhat rotated, by means of the finger member 42, engaging the face cam 44, so as to permit the openings 56 and 57 formed in the valve proper 48 to register with the openings of the valve body 10, so as to permit the flow of liquid through my improved device. The above described construction is such as will permit the valve proper 48 to be raised, so as to permit the said liquid to flow through my improved valve, around the valve proper 48, intermediate the outer portion of the said valve proper 48 and the valve housing 10.

Having thus described my invention what

I claim as new and desire to protect by Letters Patent of the United States is as follows:

1. A valve of the class described comprising a valve body, a valve head rotatively and slidably mounted therein, a pair of key members slidably supported on the valve body, an extension projecting from one of the keys, the valve head being rotatably connected to the extension, upper and lower extended elements projecting from the said key members, cam elements engaging between the upper and lower extended elements, a stub shaft projecting from the cam elements, a finger projecting from the shaft, the valve head being formed with a face cam engageable by the finger, and means for sliding said key members so that the extension projecting from one of the key members raises or lowers the valve head and the upper and lower extended elements projecting from the key members move the engaged cams, the stub shaft, and the finger, so that the finger engages the face cam of the valve head and rotates the valve head in one direction or the other.

2. A valve of the class described comprising a valve body, a valve head rotatively and slidably mounted therein, a pair of key members slidably supported on the valve body, an extension projecting from one of the keys, the valve head being rotatably connected to the extension, upper and lower extended elements projecting from the said key members, cam elements engaging between the upper and lower extended elements, a stub shaft projecting from the cam elements, and formed with an elongated axial opening adapted to receive a finger, a finger engaging in the said elongated axial opening, the valve head being formed with a face cam engageable by the finger and means for sliding said key members so that the extension projecting from one of the key members raises or lowers the valve head, and the upper and lower extended elements projecting from the key members move the engaged cams, the stub shaft, and the finger, so that the finger engages the face cam of the valve head and rotates the valve head in one direction or the other.

In testimony whereof I have affixed my signature.

HUGO HANEBERG.